United States Patent
Nie

(10) Patent No.: US 12,408,218 B2
(45) Date of Patent: Sep. 2, 2025

(54) DIRECT CONNECTION CALL METHOD, CORE NETWORK DEVICE, AND NON-TRANSITORY STORAGE MEDIUM

(71) Applicant: JRD COMMUNICATION (SHENZHEN) LTD., Guangdong (CN)

(72) Inventor: Mourong Nie, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 395 days.

(21) Appl. No.: 17/998,660

(22) PCT Filed: Jun. 1, 2020

(86) PCT No.: PCT/CN2020/093722
§ 371 (c)(1),
(2) Date: Nov. 12, 2022

(87) PCT Pub. No.: WO2021/227143
PCT Pub. Date: Nov. 18, 2021

(65) Prior Publication Data
US 2023/0199876 A1    Jun. 22, 2023

(30) Foreign Application Priority Data
May 12, 2020   (CN) .......................... 202010399173.0

(51) Int. Cl.
*H04W 76/14*    (2018.01)
*H04W 80/10*    (2009.01)

(52) U.S. Cl.
CPC ............ *H04W 76/14* (2018.02); *H04W 80/10* (2013.01)

(58) Field of Classification Search
CPC .............................. H04W 76/14; H04W 80/10
See application file for complete search history.

(56) References Cited

U.S. PATENT DOCUMENTS

| 8,417,832 B2 | 4/2013 | Abrahams et al. |
| 2012/0110208 A1 | 5/2012 | Abrahams et al. |
| 2015/0043429 A1* | 2/2015 | Kim ........................ H04L 67/52 370/328 |

FOREIGN PATENT DOCUMENTS

| CN | 1809038 A | 7/2006 |
| CN | 101658010 A | 2/2010 |

(Continued)

OTHER PUBLICATIONS

International Search Report in International application No. PCT/CN2020/093722, mailed on Feb. 18, 2021.

(Continued)

*Primary Examiner* — Brian P Cox
(74) *Attorney, Agent, or Firm* — PV IP PC; Wei Te Chung

(57) ABSTRACT

A direct connection call method includes: receiving an IP address of a first terminal by a core network device; transmitting the IP address of the first terminal to a second terminal by the core network device; receiving an IP address of the second terminal by the core network device; and transmitting the IP address of the second terminal to the first terminal by the core network device; wherein the core network device is configured to exchange the IP addresses of the first terminal and the second terminal for establishing a direct connection data link between the first terminal and the second terminal to transmit call voice data packets. A core network device and a non-transitory storage medium are also provided.

12 Claims, 6 Drawing Sheets

(56) References Cited

FOREIGN PATENT DOCUMENTS

| | | |
|---|---|---|
| CN | 103533500 A | 1/2014 |
| CN | 104113916 A | 10/2014 |
| CN | 104412646 A | 3/2015 |
| CN | 109617689 A | 4/2019 |
| CN | 109889534 A | 6/2019 |
| EP | 2763495 A1 | 8/2014 |
| EP | 2880902 A1 | 6/2015 |
| EP | 2880902 B1 * | 4/2018 ......... G06F 16/9535 |

OTHER PUBLICATIONS

Written Opinion of the International Search Authority in International application No. PCT/CN2020/093722, mailed on Feb. 18, 2021.
Chinese Office Action issued in corresponding Chinese Patent Application No. 202010399173.0 dated Dec. 24, 2020, pp. 1-8.
European Search Report in European application No. 20934992.7, mailed on Jan. 4, 2024.

* cited by examiner

DIRECT CONNECTION CALL METHOD, CORE NETWORK DEVICE, AND NON-TRANSITORY STORAGE MEDIUM

CROSS REFERENCE TO RELATED APPLICATIONS

This application is a US national phase application based upon an International Application No. PCT/CN2020/093722, filed on Jun. 1, 2020, which claims the priority of Chinese Patent Application No. 202010399173.0, entitled "DIRECT CONNECTION CALL METHOD, CORE NETWORK DEVICE, MOBILE TERMINAL, AND STORAGE MEDIUM", filed on May 12, 2020, in the China National Intellectual Property Administration (CNIPA), the contents of which are incorporated herein by reference in their entirety.

TECHNICAL FIELD

The present disclosure relates to the mobile communication field, and more particularly to a direct connection call method, a core network device, a mobile terminal, and a storage medium.

BACKGROUND ART

Currently, networks of operators have all been upgraded to 4G networks and transitioned to 5G networks. As a result, under 3G/2G networks, the call technology based on a first circuit domain gradually begins to exit from the market. The call technology based on a data domain begins to be widely used and is based on a core network (IP multimedia subsystem, IMS). A call terminal and a core network device use a session initiation protocol (SIP) to control a call process (including establishing a call, hanging up a call or the like). A signaling of the SIP is transmitted through a default bearer. During a call, a dedicated bearer is established between the terminal and the core network to transmit call content. However, establishing the dedicated bearer to transmit the call content increases a network load of the core network device and reduce efficiency of network resources.

Accordingly, the present disclosure provides a direct connection call method, a core network device, a mobile terminal, and a storage medium to solve the above-mentioned problem.

Technical Problem

Embodiments of the present disclosure provide a direct connection call method, a core network device, a mobile terminal, and a storage medium for solving the problem in the prior art that during a call, establishing a dedicated bearer by a core network to transmit call content increases a network load of the core network device and reduce efficiency of network resources.

Technical Solution

According to a first aspect of the present disclosure, an embodiment of the present disclosure provides a direct connection call method. The method includes: receiving an IP address of a first terminal by a core network device; transmitting the IP address of the first terminal to a second terminal by the core network device; receiving an IP address of the second terminal by the core network device; and transmitting the IP address of the second terminal to the first terminal by the core network device; wherein the core network device is configured to exchange the IP addresses of the first terminal and the second terminal for establishing a direct connection data link between the first terminal and the second terminal to transmit call voice data packets.

Further, before the step of receiving the IP address of the first terminal by the core network device, the method further includes: receiving a call request from the first terminal by the core network device; transmitting the call request to the second terminal by the core network device; receiving, by the core network device, a feedback message that the second terminal allows the call request; transmitting the feedback message to the first terminal by the core network device; and receiving respective conference process establishment requests from the first terminal and the second terminal by the core network device.

Further, the core network device is configured to communicate with the first terminal through a session initiation protocol.

Further, a signaling of the session initiation protocol is transmitted based on a default bearer.

Further, the core network device is configured to communicate with the second terminal through a session initiation protocol.

Further, a signaling of the session initiation protocol is transmitted based on a default bearer.

According to a second aspect of the present disclosure, an embodiment of the present disclosure provides a core network device. The core network device includes: a first receiving module configured for the core network device to receive an IP address of a first terminal; a first transmitting module configured for the core network device to transmit the IP address of the first terminal to a second terminal; a second receiving module configured for the core network device to receive an IP address of the second terminal; and a second transmitting module configured for the core network device to transmit the IP address of the second terminal to the first terminal; wherein the core network device is configured to exchange the IP addresses of the first terminal and the second terminal for establishing a direct connection data link between the first terminal and the second terminal to transmit call voice data packets.

Further, The core network device further includes: a call request receiving module configured for the core network device to receive a call request of the first terminal; a call request transmitting module configured for the core network device to transmit the call request to the second terminal; a feedback message receiving module configured for the core network device to receive a feedback message that the second terminal allows the call request; a feedback message transmitting module configured for the core network device to transmit the feedback message to the first terminal; and an establishment request receiving module configured for the core network device to receive respective conference process establishment requests from the first terminal and the second terminal.

Further, the core network device is configured to communicate with the first terminal through a session initiation protocol.

Further, a signaling of the session initiation protocol is transmitted based on a default bearer.

Further, the core network device is configured to communicate with the second terminal through a session initiation protocol.

Further, a signaling of the session initiation protocol is transmitted based on a default bearer.

According to a third aspect of the present disclosure, an embodiment of the present disclosure provides a storage medium. The storage medium has a plurality of instructions stored thereon. The instructions are loaded by a processor to execute steps of: receiving an IP address of a first terminal by a core network device; transmitting the IP address of the first terminal to a second terminal by the core network device; receiving an IP address of the second terminal by the core network device; and transmitting the IP address of the second terminal to the first terminal by the core network device; wherein the core network device is configured to exchange the IP addresses of the first terminal and the second terminal for establishing a direct connection data link between the first terminal and the second terminal to transmit call voice data packets.

Further, before the step of receiving the IP address of the first terminal by the core network device, the following steps are further executed: receiving a call request from the first terminal by the core network device; transmitting the call request to the second terminal by the core network device; receiving, by the core network device, a feedback message that the second terminal allows the call request; transmitting the feedback message to the first terminal by the core network device; and receiving respective conference process establishment requests from the first terminal and the second terminal by the core network device.

Further, the core network device is configured to communicate with the first terminal through a session initiation protocol.

Further, a signaling of the session initiation protocol is transmitted based on a default bearer.

Further, the core network device is configured to communicate with the second terminal through a session initiation protocol.

Further, a signaling of the session initiation protocol is transmitted based on a default bearer.

Advantageous Effects

Compared with the prior art, the direct connection call method, the core network device, the mobile terminal, and the storage medium provided by the present disclosure exchange, by the core network device, the IP addresses of the first terminal and the second terminal for establishing a direct connection data link between the first terminal and the second terminal to transmit call voice data packets, thereby reducing a network load of the core network device and improving efficiency of network resources.

DETAILED DESCRIPTION OF EMBODIMENTS

Figure 1:
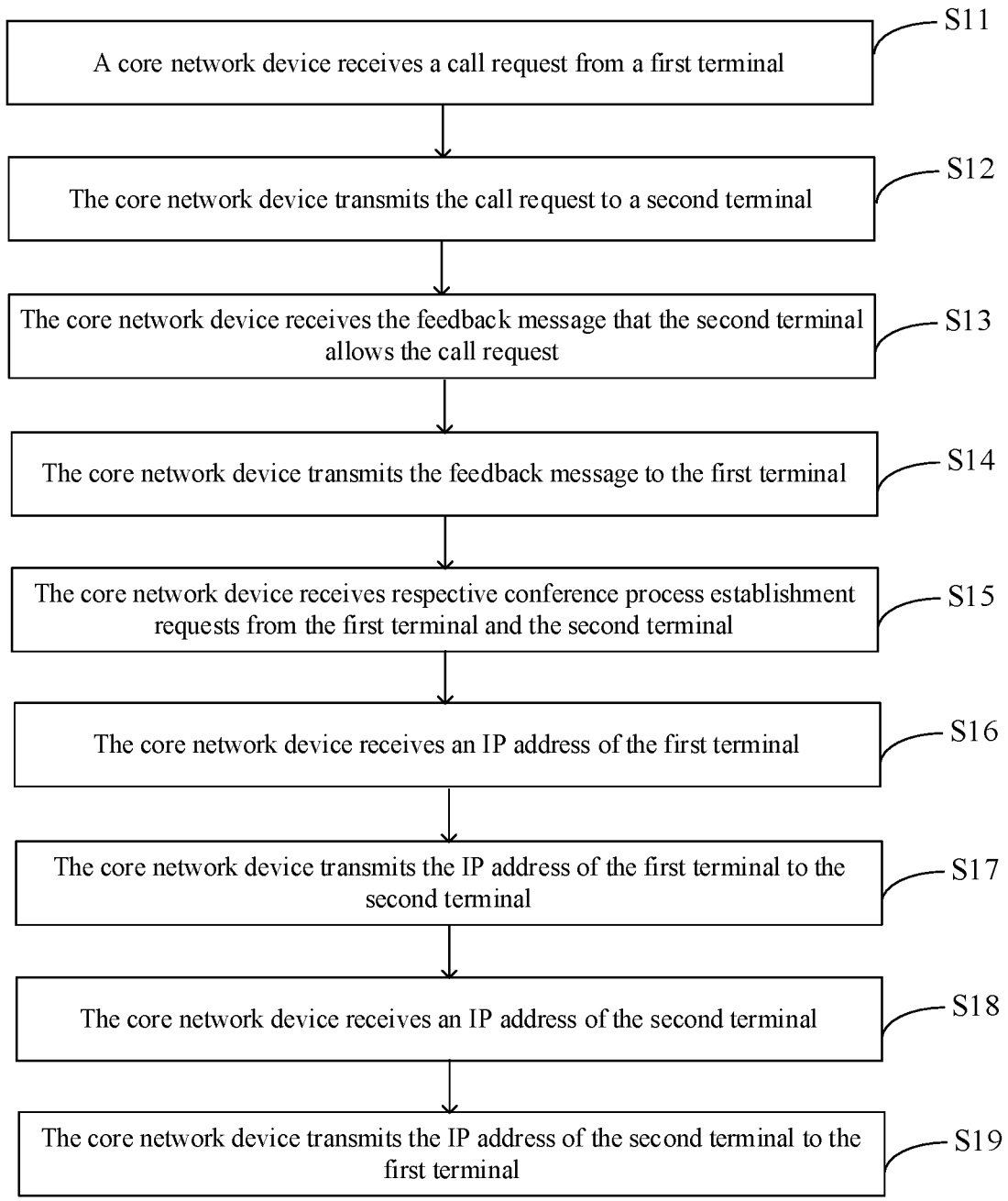
FIG. 1 illustrates a schematic flowchart of steps in a direct connection call method provided by an embodiment of the present disclosure.

The following clearly and completely describes the technical solutions in the embodiments of the present disclosure with reference to the accompanying drawings in the embodiments of the present disclosure. The described embodiments are some rather than all of the embodiments of the present disclosure. All other embodiments obtained by those skilled in the art based on the embodiments of the present disclosure without creative efforts shall fall within the protection scope of the present disclosure.

The terms "first", "second", "third", and the like (if any) in the specification and the claims of the present disclosure and the foregoing accompanying drawings are used for distinguishing similar objects, and are not necessarily used for describing a particular sequence or order. It should be understood that objects used in such a way are interchangeable in proper circumstances. In addition, the terms "include", "have" and any other variants are intended to cover the non-exclusive inclusion.

In the embodiments, the drawings which are discussed below and the various embodiments used for describing the principles of the present disclosure are intended to be illustrative only and not to limit the scope of the present disclosure. Those skilled in the art will appreciate that the principles of the present disclosure can be implemented in any suitably arranged system. Exemplary embodiments will be described in detail, examples of which are illustrated in the accompanying drawings. Furthermore, a mobile terminal according to an exemplary embodiment will be described in detail with reference to the accompanying drawings. The same reference numerals in the drawings denote the same elements.

The terms used in the embodiments are used for describing a particular embodiment only and are not intended to convey the concepts of the present disclosure. Expressions used in the singular encompass expressions in the plural unless the context clearly indicates otherwise. In the specification of the present disclosure, it should be understood that terms such as "comprising", "having" and "containing" are intended to indicate the presence of the features, numbers, steps, acts, or combinations thereof disclosed in the specification of the present disclosure. It is not intended to exclude the possibility that one or more other features, numbers, steps, acts or combinations may be added. The same reference numerals in the drawings denote the same parts.

In the description of the present disclosure, it should be noted that unless otherwise clearly defined and limited, the terms "mounted", "connected/coupled", and "connection" should be interoperated broadly. For example, the terms may refer to a fixed connection, a detachable connection, or an integral connection; the terms may also refer to a mechanical connection, an electrical connection, or communication with each other; the terms may further refer to a direct connection, an indirect connection through an intermediary, or an interconnection between two elements or interactive relationship between two elements. Those skilled in the art can appreciate the specific meanings of the above-mentioned terms in the present disclosure according to circumstances.

The following description provides various embodiments or examples for implementing various structures of the present disclosure. To simplify the description of the present disclosure, parts and settings of specific examples are described as follows. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the settings. Furthermore, the present disclosure provides specific examples of various processes and materials, however, applications of other processes and/or other materials may be appreciated by those skilled in the art.

Specifically, referring to FIG. 1, an embodiment of the present disclosure provides a direct connection call method including the following steps.

In step S11, a core network device receives a call request from a first terminal.

In the embodiment of the present disclosure, the core network device is configured to communicate with the first terminal through a session initiation protocol (SIP). A signaling of the session initiation protocol is transmitted based on a default bearer.

In step S12, the core network device transmits the call request to a second terminal.

In the embodiment of the present disclosure, the core network device is configured to communicate with the second terminal through the session initiation protocol (SIP). A signaling of the session initiation protocol is transmitted based on a default bearer. After receiving the call request initiated by the first terminal, the core network device can forward the call request to the second terminal. After receiving the call request, the second terminal can display the call request through a visual interface (such as a caller ID interface). When an instruction from a user to connect a call is received (for example, the call is connected on the caller ID interface), the second terminal is configured to transmit a feedback message allowing the call request to the core network device.

In step S13, the core network device receives the feedback message that the second terminal allows the call request.

In step S14, the core network device transmits the feedback message to the first terminal.

In step S15, the core network device receives respective conference process establishment requests from the first terminal and the second terminal.

In step S16, the core network device receives an IP address of the first terminal.

In step S17, the core network device transmits the IP address of the first terminal to the second terminal.

In step S18, the core network device receives an IP address of the second terminal.

In step S19, the core network device transmits the IP address of the second terminal to the first terminal.

In the embodiment of the present disclosure, the core network device is configured to exchange the IP addresses of the first terminal and the second terminal for establishing a direct connection data link between the first terminal and the second terminal to transmit call voice data packets. In the prior art, during a call, a dedicated bearer is established between a terminal and a core network to transmit call content. In the present disclosure, by implementing steps S11 to S19, a network load of the core network device can be reduced, and efficiency of network resources can be improved. The first terminal is configured to establish a connection with the second terminal through a transmission control protocol (TCP), so as to realize direct communication.

Figure 2:
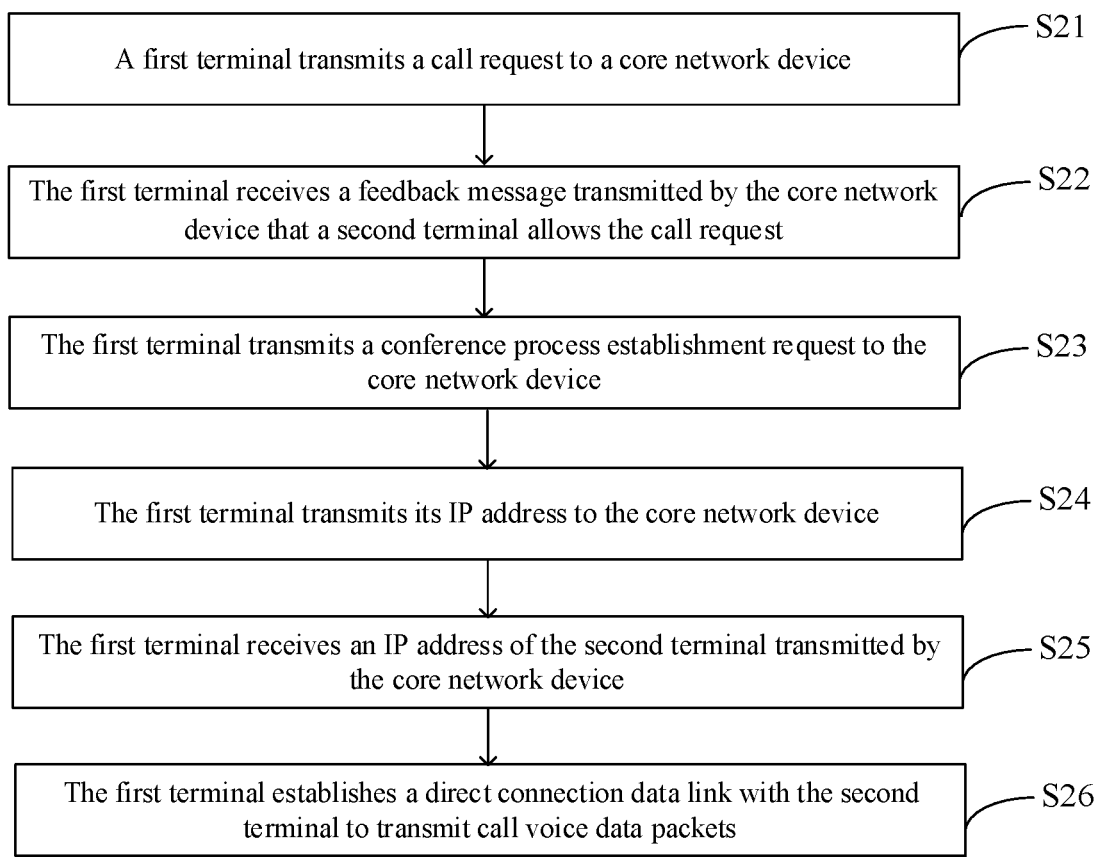
FIG. 2 illustrates a schematic flowchart of steps in a direct connection call method provided by another embodiment of the present disclosure.

Referring to FIG. 2, the present disclosure provides another direct connection call method including the following steps.

In step S21, a first terminal transmits a call request to a core network device.

In the embodiment of the present disclosure, the first terminal is configured to communicate with the core network device through a session initiation protocol (SIP).

In step S22, the first terminal receives a feedback message transmitted by the core network device that a second terminal allows the call request.

In step S23, the first terminal transmits a conference process establishment request to the core network device.

In step S24, the first terminal transmits its IP address to the core network device.

In step S25, the first terminal receives an IP address of the second terminal transmitted by the core network device.

In step S26, the first terminal establishes a direct connection data link with the second terminal to transmit call voice data packets.

In the embodiment of the present disclosure, the first terminal is configured to exchange the IP addresses with the second terminal through the core network device and establish a connection with the second terminal through a transmission control protocol (TCP) to realize direct communication, thereby reducing a network load of the core network device and improving efficiency of network resources.

Figure 3:
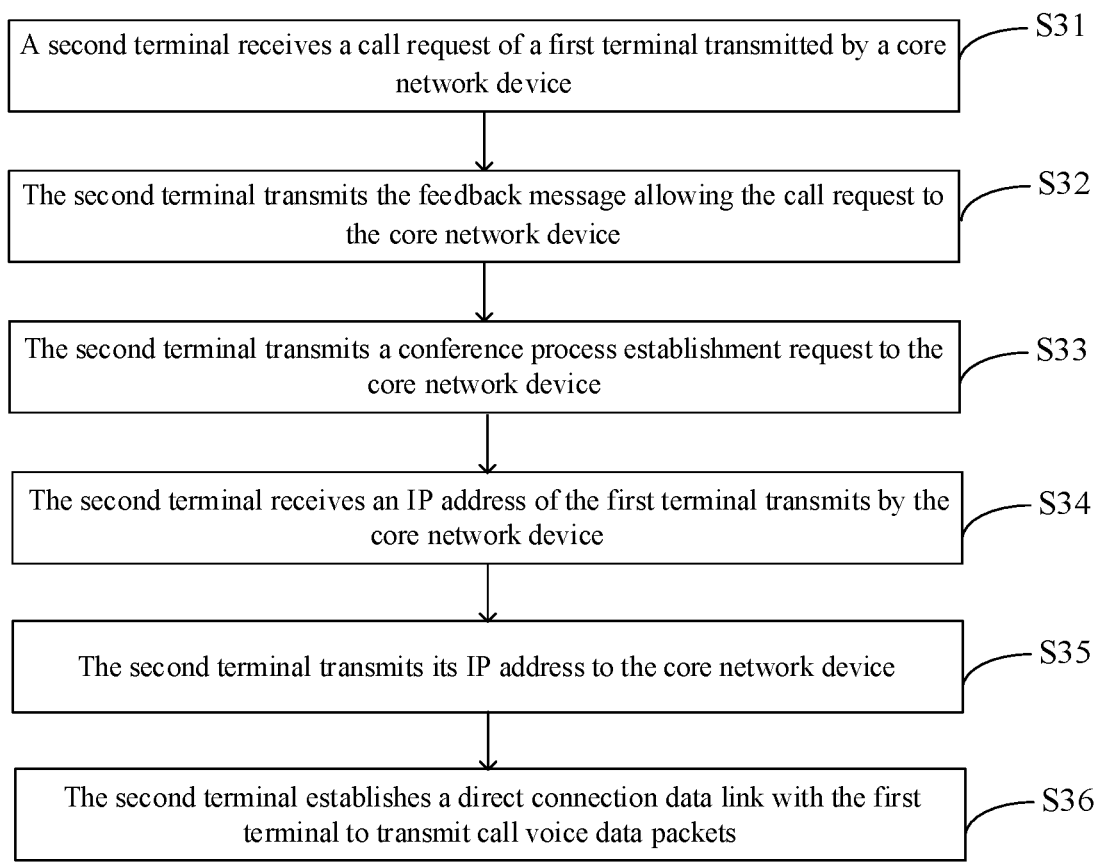
FIG. 3 illustrates a schematic flowchart of steps in a direct connection call method provided by yet another embodiment of the present disclosure.

Referring to FIG. 3, the present disclosure provides yet another direct connection call method including the following steps.

In step S31, a second terminal receives a call request of a first terminal transmitted by a core network device.

In the embodiment of the present disclosure, the second terminal is configured to communicate with the core network device through a session initiation protocol (SIP). After receiving the call request initiated by the first terminal, the core network device can forward the call request to the second terminal. After receiving the call request, the second terminal can display the call request through a visual interface (such as a caller ID interface). When an instruction from a user to connect a call is received (for example, the call is connected on the caller ID interface), the second terminal is configured to transmit a feedback message allowing the call request to the core network device.

In step S32, the second terminal transmits the feedback message allowing the call request to the core network device.

In step S33, the second terminal transmits a conference process establishment request to the core network device.

In step S34, the second terminal receives an IP address of the first terminal transmits by the core network device.

In step S35, the second terminal transmits its IP address to the core network device.

In step S36, the second terminal establishes a direct connection data link with the first terminal to transmit call voice data packets.

In the embodiment of the present disclosure, the second terminal is configured to exchange the IP addresses with the first terminal through the core network device and establish a connection with the first terminal through a transmission control protocol (TCP) to realize direct communication, thereby reducing a network load of the core network device and improving efficiency of network resources.

Figure 4:
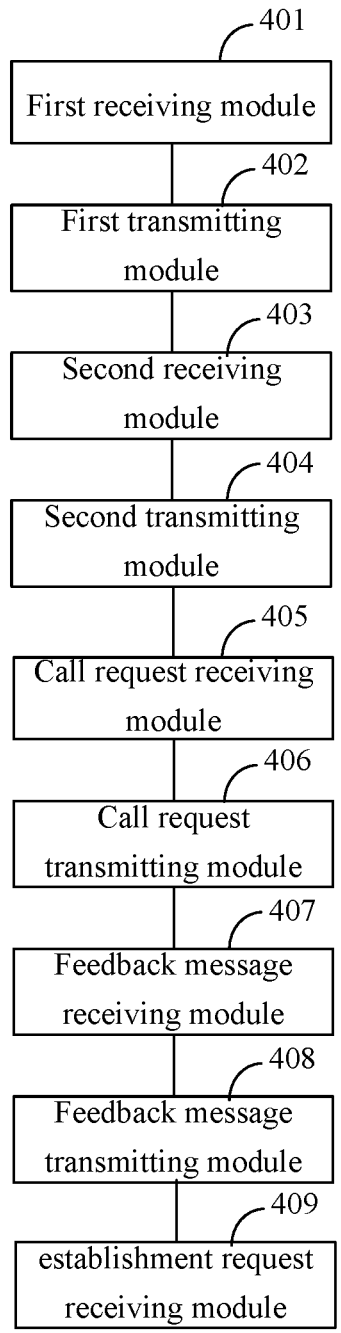
FIG. 4 illustrates a structural schematic diagram of a core network device provided by an embodiment of the present disclosure.

Referring to FIG. 4, an embodiment of the present disclosure provides a core network device including a first receiving module 401, a first transmitting module 402, a second receiving module 403, a second transmitting module 404, a call request receiving module 405, a call request transmitting module 406, a feedback message receiving module 407, a feedback message transmitting module 408, and an establishment request receiving module 409.

The first receiving module 401 is configured for the core network device to receive an IP address of a first terminal.

In the embodiment of the present disclosure, the core network device is configured to communicate with the first terminal through a session initiation protocol (SIP). A signaling of the session initiation protocol is transmitted based on a default bearer.

The first transmitting module 402 is configured for the core network device to transmit the IP address of the first terminal to a second terminal.

The second receiving module 403 is configured for the core network device to receive an IP address of the second terminal.

In the embodiment of the present disclosure, the core network device is configured to communicate with the second terminal through a session initiation protocol (SIP). A signaling of the session initiation protocol is transmitted based on a default bearer.

The second transmitting module 404 is configured for the core network device to transmit the IP address of the second terminal to the first terminal.

The call request receiving module 405 is configured for the core network device to receive a call request of the first terminal.

The call request transmitting module 406 is configured for the core network device to transmit the call request to the second terminal.

The feedback message receiving module 407 is configured for the core network device to receive a feedback message that the second terminal allows the call request.

The feedback message transmitting module 408 is configured for the core network device to transmit the feedback message to the first terminal.

The establishment request receiving module 409 is configured for the core network device to receive respective conference process establishment requests from the first terminal and the second terminal.

In the embodiment of the present disclosure, the core network device is configured to exchange the IP addresses of the first terminal and the second terminal for establishing a direct connection data link between the first terminal and the second terminal to transmit call voice data packets, thereby reducing a network load of the core network device and improving efficiency of network resources. The first terminal is configured to establish a connection with the second terminal through a transmission control protocol (TCP) to realize direct communication.

Figure 5:
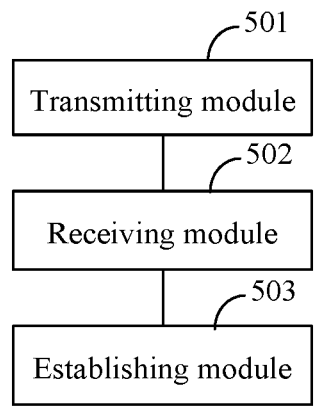
FIG. 5 illustrates a structural schematic diagram of a mobile terminal provided by an embodiment of the present disclosure.

Referring to FIG. 5, an embodiment of the present disclosure provides a mobile terminal including a transmitting module 501, a receiving module 502, and an establishing module 503.

The transmitting module 501 is configured for a first terminal to transmit its IP address to a core network device.

In the embodiment of the present disclosure, the first terminal is configured to communicate with a core network device through a session initiation protocol (SIP).

The receiving module 502 is configured for the first terminal to receive an IP address of a second terminal transmitted by the core network device.

The establishing module 503 is configured for the first terminal to establish a direct connection data link between the first terminal and the second terminal to transmit call voice data packets.

In the embodiment of the present disclosure, the first terminal is configured to exchange the IP addresses with the second terminal through the core network device and establish a connection with the second terminal through a transmission control protocol (TCP) to realize direct communication, thereby reducing a network load of the core network device and improving efficiency of network resources.

Figure 6:
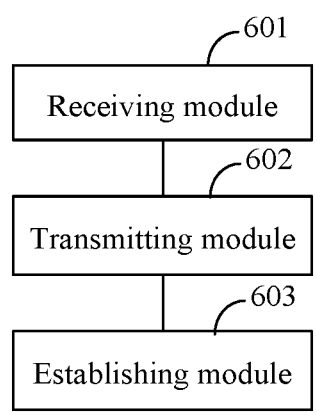
FIG. 6 illustrates a structural schematic diagram of a mobile terminal provided by another embodiment of the present disclosure.

Referring to FIG. 6, an embodiment of the present application provides a mobile terminal including a receiving module 601, a transmitting module 602, and an establishing module 603.

The receiving module 601 is configured for a second terminal to receive an IP address of a first terminal transmitted by a core network device.

In this embodiment of the present disclosure, the second terminal is configured to communicate with the core network device through a session initiation protocol (SIP).

The transmitting module 602 is configured for the second terminal to transmit its IP address to the core network device.

The establishing module 603 is configured for the second terminal to establish a direct connection data link between the second terminal and the first terminal to transmit call voice data packets.

The second terminal is configured to exchange the IP addresses with the first terminal through the core network device and establish a connection with the first terminal through a transmission control protocol (TCP) to realize direct communication, thereby reducing a network load of the core network device and improving efficiency of network resources.

Figure 7:
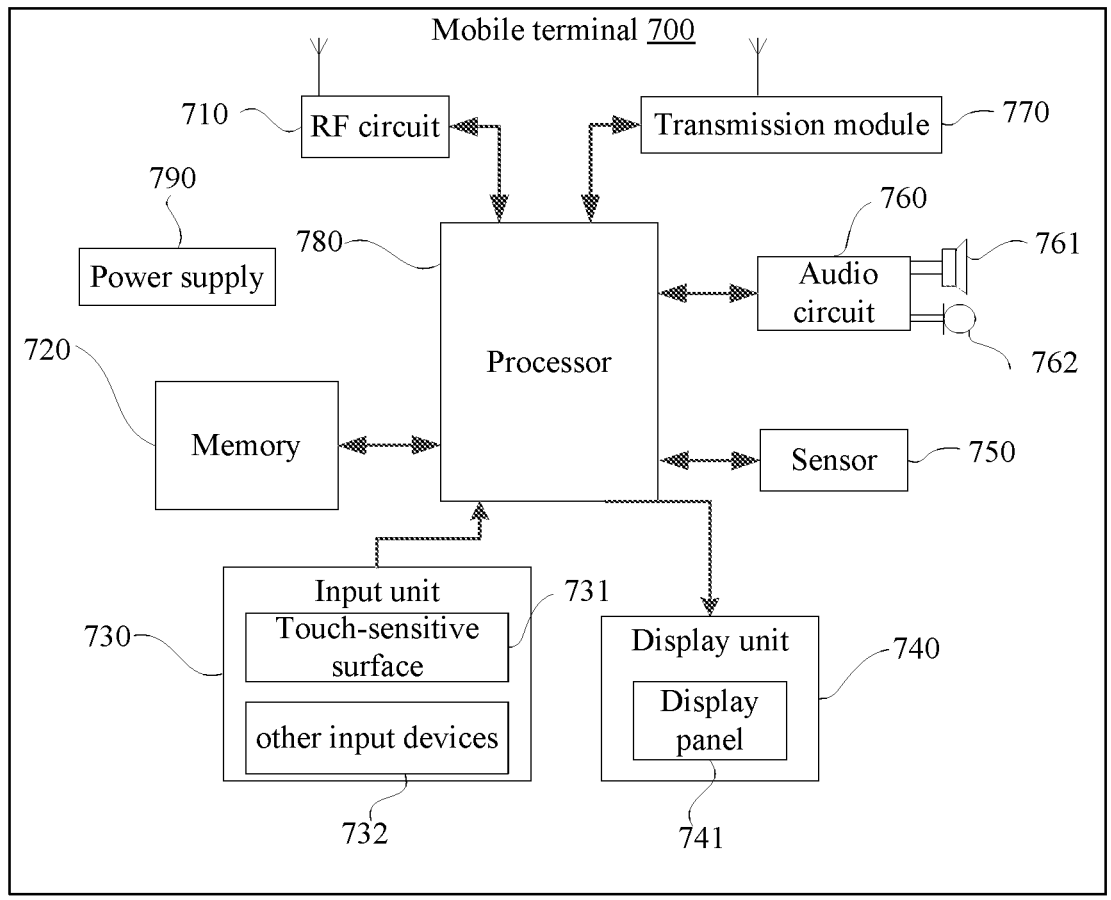
FIG. 7 illustrates a specific structural schematic diagram of a mobile terminal provided by an embodiment of the present disclosure.

Please refer to FIG. 7. FIG. 7 illustrates a structural schematic diagram of a mobile terminal 700 provided by an embodiment of the present disclosure. The mobile terminal 700 can be used for implementing the direct connection call method provided in any one of the above-mentioned embodiments. The mobile terminal can be a mobile phone or a tablet. The mobile terminal 700 includes the following parts.

An RF circuit 710 is configured to receive and transmit electromagnetic waves and to realize conversions of the electromagnetic waves and electrical signals, thereby communicating with a communication network or any other device. The RF circuit 710 can include various conventional circuit elements used for performing these functions, for example, an antenna, a radio frequency transmitter, a digital signal processor, an encryption/decryption chip, a subscriber identification module (SIM) card, a memory and the like. The RF circuit 710 can communicate with various networks, for example, an internet, an intranet or a wireless network, or can communicate with any other device via a wireless network. The above-mentioned wireless network can include a cellular telephone network, a wireless local area network or a metropolitan area network. The above-mentioned wireless network can use various communication standards, protocols and technologies and can include but not limited to, Global System of Mobile Communication (GSM), Enhanced Data GSM Environment (EDGE), Wideband Code Division Multiple Access (WCDMA), Code Division Multiple Access (CDMA), Time Division Multiple Access (TDMA), Wireless Fidelity (Wi-Fi, for example, Institute of Electrical and Electronics Engineers (IEEE) 802.11a, IEEE 802.11b, IEEE 802.11g and/or IEEE 802.11n), Voice over Internet Protocol (VoIP), Worldwide Interoperability for Microwave Access (Wi-Max), other protocols for E-mail, instant messaging and Short Messaging Service and other suitable communication protocols, and can include protocols which are not developed currently.

A processor 780 is a control center of the mobile terminal 700, is connected with all the parts of the whole mobile terminal by various interfaces and lines, and is configured to execute various functions of the mobile terminal and process the data by executing or loading software programs stored in a memory 720 and calling data stored in the memory 720, so as to carry out integral monitoring on the mobile terminal. In the present embodiment, the mobile terminal 700 is provided with multiple storage partitions. The multiple storage partitions include a system partition and a target partition. Instructions corresponding to processes of one or more application programs are loaded into the memory 720, and the application programs stored in the memory 720 are executed by the processor 780. The memory 720 can be configured to store software programs and modules, such as the program instructions/modules corresponding to any one of the direct connection call methods in the above-mentioned embodiments. The processor 780 is configured to execute various functional applications and data processing by running the software programs and modules stored in the memory 720. That is, the functions of the direct connection call methods are realized. The memory 720 can include a high-speed random access memory, and can also include a non-volatile memory, such as one or more magnetic storage devices, a flash memory, or other non-volatile solid-state memories. In some examples, the memory 720 can further include at least one memory located remotely from the processor 780. The at least one remote memory can be connected to the mobile terminal 700 through a network. Examples of such networks include, but are not limited to, an internet, an intranet, a local area network, a mobile communication network, and combinations thereof.

An input unit 730 can be configured to receive input number or character information and configured to generate keyboard, mouse, joystick, optical or trajectory ball signal inputs related to a user's setting and functional control. In detail, the input unit 730 can include a touch-sensitive surface 731 and other input devices 732. The touch-sensitive surface 731, which is also called a touch display screen or a touch panel, can be configured to detect touch operations of a user on or near the touch-sensitive surface 731 (for example, operations carried out by the user through any suitable objects or attachments, such as a finger, a touch pen and the like, on the touch-sensitive surface 731 or near the touch-sensitive surface 731) and to drive a corresponding device connected therewith according to a preset program. Optionally, the touch-sensitive surface 731 can include a touch detection device and a touch controller. The touch detection device detects the touch direction of the user, detects a signal caused by the touch operation, and transmits the signal to the touch controller. The touch controller receives touch information from the touch detection device, converts the touch information into a contact coordinate, and then transmits the contact coordinate to the processor 780 and can receive a command transmitted by the processor 780 and execute the command. Moreover, the touch-sensitive surface 731 can be one of various types, such as a resistance type, a capacitance type, an infrared type, a surface acoustic wave type and the like. Besides the touch-sensitive surface 731, the input unit 730 can also include the other input devices 732. In detail, other input devices 732 can include, but is not limited to, one or more of a physical keyboard, function keys (such as a volume control key, a switching key and the like), a trackball, a mouse, a joystick and the like.

A display unit 740 can be configured to display information input by the user or information provided for the user and various graphical user interfaces of the mobile terminal 700. The graphical user interfaces can be constituted by graphics, texts, icons, videos and any combinations of them. The display unit 740 can include a display panel 741. Optionally, the display panel 741 can be configured in forms of a Liquid Crystal Display (LCD), an Organic Light-Emitting Diode (OLED) and the like. Furthermore, the touch panel 731 can cover the display panel 741. When the touch-sensitive surface 731 detects a touch operation on or near it, the signal caused by the touch operation is transmitted to the processor 780 to determine the type of a touch event. Then, the processor 780 provides a corresponding visual output on the display panel 741 according to the type of the touch event. Although the touch-sensitive surface 731 and the display panel 741 in FIG. 7 are served as two independent parts for accomplishing input and output functions, it can be understood that the touch-sensitive surface 731 and the display panel 741 can be integrated to accomplish the input and output functions.

The mobile terminal 700 can further include at least one sensor 750, such as an optical sensor, a motion sensor and other sensors. In detail, the optical sensor can include an environmental light sensor and a proximity sensor. The environmental light sensor can adjust brightness of the display panel 741 according to the lightness of environmental light. The proximity sensor can generate an interruption when the mobile terminal 700 is flipped or closed or turned off. As one type of the motion sensor, an accelerometer sensor can detect the value of an acceleration in each direction (generally in three axial directions), can detect the value and the direction of gravity in a static state, which can be used in posture identifying functions (such as switching between a horizontal screen and a vertical screen, switching related to a game, and calibration on the posture of a magnetometer), vibration identifying functions (such as for pedometer and striking) and the like. Furthermore, a gyroscope, a barometer, a humidity meter, a thermometer, an infrared sensor and other sensors can be integrated into the mobile terminal 700, and explanations are not repeated herein.

An audio circuit 760, a speaker 761 and a microphone 762 can provide an audio interface between the user and the mobile terminal 700. The audio circuit 760 can transmit an electric signal obtained by converting received audio data to the speaker 761. The electric signal is converted into a sound signal to be outputted by the speaker 761. On the other hand, the microphone 762 converts a collected sound signal into an electric signal. The audio circuit 760 receives the electric signal and converts the electric signal into audio data. After the audio data is outputted to the processor 780 and is processed, it is transmitted, for example, to another terminal through the RF circuit 710, or is outputted to the memory 720 in order to be further processed. The audio circuit 760 can further include an ear plug hole for providing communication between an external earphone and the mobile terminal 700.

The mobile terminal 700 can help the user to receive requests, send E-mails and the like by a transmission module 770 (for example, a Wi-Fi module). The transmission module 770 provides wireless broadband internet access for the user. Although the transmission module 770 is shown in FIG. 7, it should be understood that the transmission module 770 is not the necessary part of the mobile terminal 700 and can completely be omitted as required without changing the scope of essence of the present disclosure.

The processor 780 is a control center of the mobile terminal 700, is connected with all the parts of the whole mobile phone by various interfaces and lines, and is configured to execute various functions of the mobile terminal 700 and process the data by executing or loading software programs stored in a memory 720 and calling data stored in the memory 720, so as to carry out integral monitoring on the mobile terminal. Optionally, the processor 780 can include one or more processing cores. In some embodiments, the processor 780 can be integrated with an application processor and a modulation/demodulation processor. The application processor is mainly configured to process an operating system, at least one user interface, at least one application program and the like. The modulation/demodulation processor is mainly configured to process wireless communication. It can be understood that the modulation/demodulation processor can also be not integrated into the processor 780.

The mobile terminal 700 further includes a power supply 790 (such as a battery) for supplying power to each part. In some embodiments, the power supply can be logically connected with the processor 780 by a power supply management system, so as to implement functions of charge management, discharge management, power consumption management and the like by the power supply management system. The power supply 790 can further include one or more direct current or alternating current power supplies, recharging systems, power supply failure detection circuits, power converters or inverters, power supply status indicators and the like.

Although not shown in the FIG. 7, the mobile terminal 700 can further include a camera (for example, a front camera or a rear camera), a BLUETOOTH module, and the like which are not further described herein. In the present embodiment, the display unit of the mobile terminal is a touch screen display, and the mobile terminal further includes a memory and one or more programs. The one or more programs are stored in the memory and configured to be executed by one or more processors to perform instructions for executing any one of the direct connection call methods contained in the one or more programs.

In specific implementations, the above-mentioned modules can be implemented as independent entities, and also can be combined in any combination and implemented as one or a plurality of entities. For the specific implementations of each module above, reference can be made to the above-mentioned method embodiments, and details are not further described herein.

Those skilled in the art can understand that all or some of the steps in various methods of the above-mentioned embodiments can be implemented through instructions or implemented through instructions controlling relevant hardware, and the instructions can be stored in a computer-readable storage medium and loaded and executed by a processor. To this end, an embodiment of the present disclosure provides a storage medium storing a plurality of instructions, and the instructions can be loaded by the processor, to perform the steps in the direct connection call method provided by any one of the embodiments of the present disclosure.

The storage medium can include: a read-only memory (ROM), a random access memory (RAM), a magnetic disk, an optical disc or the like.

Since the instructions stored in the storage medium can perform the steps of the direct connection call method provided by any one of the embodiments of the present disclosure, the instructions can implement advantageous effects which can be implemented by the direct connection call method provided by any one of the embodiments of the present disclosure. Details can be referred to the above-mentioned embodiments and are not described herein. Specific implementations of each operation can be referred to the above-mentioned embodiments and are not described herein.

In the direct connection call method, the core network device, the mobile terminal, and the storage medium provided by the present disclosure, the core network device is configured to exchange the IP addresses of the first terminal and the second terminal for establishing the direct connection data link between the first terminal and the second terminal to transmit the call voice data packets, thereby reducing the network load of the core network device and improving the efficiency of the network resources.

The descriptions of the above-mentioned embodiments have different emphasis, and as for parts that are not described in detail in one embodiment, reference can be made to the relevant descriptions of other embodiments.

The direct connection call method, the core network device, the mobile terminal, and the storage medium provided by the embodiments of the present disclosure are introduced in detail above. The principles and implementations of the present disclosure are illustrated through some embodiments. However, the descriptions of the above-mentioned embodiments are only used to help understand the technical solutions and core ideas of the present disclosure. Those skilled in the art should understand that they can still make modifications to the technical solutions described in the above-mentioned embodiments or make equivalent replacements to some technical features thereof, as long as such modifications or replacements do not cause the essence of corresponding technical solutions to depart from the spirit and scope of the technical solutions of the embodiments of the present disclosure.

What is claimed is:

1. A direct connection call method, comprising:
   receiving a call request from the first terminal by the core network device through a session initiation protocol;
   transmitting the call request to the second terminal by the core network device through a session initiation protocol;
   receiving, by the core network device, a feedback message that the second terminal allows the call request;
   in response to the feedback message, receiving an IP address of a first terminal by a core network device;
   transmitting the IP address of the first terminal to a second terminal by the core network device;
   in response to the feedback message, receiving an IP address of the second terminal by the core network device; and
   transmitting the IP address of the second terminal to the first terminal by the core network device;
   wherein the core network device is configured to exchange the IP addresses of the first terminal and the second terminal for establishing a direct connection data link between the first terminal and the second terminal to transmit call voice data packets.

2. The direct connection call method of claim 1, wherein before the step of receiving the IP address of the first terminal by the core network device, the method further comprises:
   transmitting the feedback message to the first terminal by the core network device; and receiving respective conference process establishment requests from the first terminal and the second terminal by the core network device.

3. The direct connection call method of claim 1, wherein a signaling of the session initiation protocol is transmitted based on a default bearer.

4. The direct connection call method of claim 1, wherein a signaling of the session initiation protocol is transmitted based on a default bearer.

5. A core network device, comprising a processor and a memory, wherein the processor is electrically connected to the memory, the memory is configured to store a plurality of instructions, and the instructions are loaded by the processor to execute steps of:
   receiving a call request of the first terminal through a session initiation protocol;
   transmitting the call request to the second terminal through a session initiation protocol;
   receiving a feedback message that the second terminal allows the call request;
   in response to the feedback message, receiving an IP address of a first terminal;
   transmitting the IP address of the first terminal to a second terminal;
   in response to the feedback message, receiving an IP address of the second terminal; and
   transmitting the IP address of the second terminal to the first terminal;
   wherein the core network device is configured to exchange the IP addresses of the first terminal and the second terminal for establishing a direct connection data link between the first terminal and the second terminal to transmit call voice data packets.

6. The core network device of claim 5, wherein the instructions are loaded by the processor to further execute steps of:
   transmitting the feedback message to the first terminal; and
   receiving respective conference process establishment requests from the first terminal and the second terminal.

7. The core network device of claim 5, wherein a signaling of the session initiation protocol is transmitted based on a default bearer.

8. The core network device of claim 5, wherein a signaling of the session initiation protocol is transmitted based on a default bearer.

9. A non-transitory storage medium, the storage medium having a plurality of instructions stored thereon, the instructions being loaded by a processor to execute steps of:
   receiving a call request from the first terminal by the core network device through a session initiation protocol;
   transmitting the call request to the second terminal by the core network device through a session initiation protocol;
   receiving, by the core network device, a feedback message that the second terminal allows the call request;
   in response to the feedback message, receiving an IP address of a first terminal by a core network device;
   transmitting the IP address of the first terminal to a second terminal by the core network device;
   in response to the feedback message, receiving an IP address of the second terminal by the core network device; and
   transmitting the IP address of the second terminal to the first terminal by the core network device;
   wherein the core network device is configured to exchange the IP addresses of the first terminal and the second terminal for establishing a direct connection data link between the first terminal and the second terminal to transmit call voice data packets.

10. The non-transitory storage medium of claim 9, wherein before the step of receiving the IP address of the first terminal by the core network device, the following steps are further executed:
    transmitting the feedback message to the first terminal by the core network device; and
    receiving respective conference process establishment requests from the first terminal and the second terminal by the core network device.

11. The non-transitory storage medium of claim 10, wherein a signaling of the session initiation protocol is transmitted based on a default bearer.

12. The non-transitory storage medium of claim 10, wherein a signaling of the session initiation protocol is transmitted based on a default bearer.

* * * * *